Nov. 12, 1968   H. BURGER   3,410,284

CLEANING INSTALLATIONS FOR VEHICLES

Filed March 24, 1966   2 Sheets-Sheet 1

Horst Burger
INVENTOR.

BY

Ross & Meston

Nov. 12, 1968   H. BURGER   3,410,284
CLEANING INSTALLATIONS FOR VEHICLES
Filed March 24, 1966   2 Sheets-Sheet 2

Horst Burger
INVENTOR.

BY

Ross & Mestern

United States Patent Office 3,410,284
Patented Nov. 12, 1968

3,410,284
CLEANING INSTALLATIONS FOR VEHICLES
Horst Burger, Augsburg, Germany, assignor to Bowe
Bohler & Weber KG, a corporation of Germany
Filed Mar. 24, 1966, Ser. No. 537,112
Claims priority, application Germany, Mar. 26, 1965,
B 81,177
4 Claims. (Cl. 134—57)

ABSTRACT OF THE DISCLOSURE

Treatment plant for automotive vehicles to be subjected to spraying or drying by a fluid stream emitted from a mobile source, such as one or more nozzles movable vertically along a frame through which a car to be treated is being driven, the contour of the car being scanned by one or more electric eyes whose light beam or beams are intercepted by one or more photocells generating three signals in response to full, partial or low illumination, respectively; the first signal causes an advance of the nozzle support toward the vehicle, the second signal arrests the support, and the third signal initiates its withdrawal from the vehicle.

---

The invention concerns improvements in or relating to a car-washing installation, in which a washing device and a car are moved relative to one another. Conventional installations of this type, designed to accelerate car washing and reduce work for the operators, include a washing device, for example, a brush or a nozzle arrangement or the like for spraying washing fluid or for directing drying air, which is moved along the vehicle surface under the action of a spring or by gravity. Hydraulic or pneumatic drives may also be used for bringing the washing device into the direct vicinity of the car.

Thus, in a known apparatus a nozzle arrangement is moved along the vehicle with a slight spacing from the surface thereof by means of guide rollers which are supported on the car surface. The action of the medium flowing out of the nozzles in such an apparatus, owing to the slight spacing, is highly effective but the necessary supporting rollers cause an undesired strain on the car surface.

It is an object of the invention to eliminate the above disadvantages and to provide a washing device which will not damage the surface of a car and which automatically adjusts itself in accordance with the outlines of the car surface.

In accordance with the present invention I solve this problem by providing a drive means for so displacing the washing device in the direction of the car as to be switched off when part of the cross-sectional area of at least one light beam of an electric eye connected with the washing device is obscured, other drive means being provided for moving the washing device away from the car when more than this part of the beam area is obscured. This causes the washing device advancing toward the car to follow the contour thereof with a substantially constant spacing. Structure and method of operation of an electric eye, which generally includes at one end a light source and at the other end a photo element, e.g., a photoelectric cell or a photoelectric resistance, are known and need not be described in detail.

In order that minor surface irregularity of the car should not set off commensurate movements or oscillations of the washing device, a more particular feature of any invention provides that the beam area to be obscured for switching on the second drive means substantially exceeds the beam area whose obstruction arrests the first drive means. Thus, for example, a blocking of about a third of the light beam stops the forward drive, which moves the washing device toward the car, whereas the return drive is actuated only after about two thirds of the light beam are obstructed so as to move the washing device away from the car. Owing to the tolerance so created, excessively fast positional changes and "hunting" of the washing device are eliminated.

In a particularly advantageous embodiment of the invention two electric eyes are arranged on opposite sides of the washing device to control its movement to and from the car, as by having the outputs of their photoelectric cells connected in parallel to the input of an associated amplifier. By this means sudden and large changes occurring in the car surface are reported in good time to the driving mechanism of the washing device.

The washing device according to my invention may have one pivotal nozzle arrangement facing in both directions or two pivotal nozzle arrangements facing in different directions for spraying the washing liquid or air, these nozzles being so coupled with the two electric eyes that with complete or partial interruption of only one light beam the nozzle arrangement is pivotable in one direction associated with this light beam or only one nozzle arrangement, associated with this light beam, is operative. Consequently if the washing device assumes a position directly adjacent the front or rear side, the spraying device is adjustable in the corresponding direction. In accordance with the invention provision I may also arrange two aligned photoelectric elements in spaced relationship from one another at an end of the light path, obstruction of one or the other element causing the drives for the movement of the washing device to be switched off or on. The effective light-beam cross-section thus corresponds in this case to the sum of the aperture areas of the two individual photoelectric elements. A common light source may be provided for both photoelectric elements, or alternatively one for each photoelectric element. Such an embodiment of the invention has the advantage of enabling not only the setting of greater tolerances for surface changes in accordance with the mutual distance of the two photoelectric elements, thereby suppressing hunting, but also the separate selection of the switching voltages for the control of the two drive means at the terminals of the photoelectric elements or the amplifier connected thereto. According to a further aspect of this feature it is also possible, in an arrangement with two electric eyes, to provide a common photoelectric element for both.

The present invention will now be described further, by way of example, with reference to the accompanying drawing in which.

Figure 1:
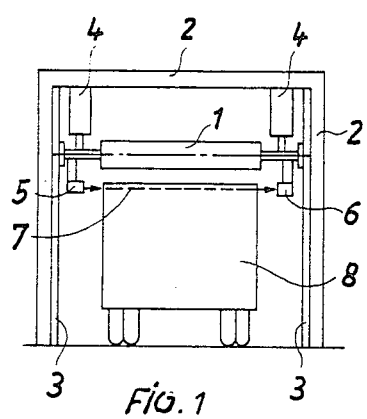
FIG. 1 is a schematic front view of a washing installation.

FIG. 1 diagrammatically shows a gantry installation in which a washing device 1 is mounted so as to be vertically and horizontally reciprocated in a guide device 3 arranged with a frame 2, for example on rails or the like. The assembly 1 may thus be driven by means of pressure cylinders 4 which are representative of any suitable driving means. With the washing device 1, which, for example, may be an arrangement of a number of nozzles directed against the vehicle surface, but which could also be a rotary cylinder provided with brushes, or with the mounting of that device there is coupled an electric eye formed by a light source 5 and a photoelectric element 6, e.g., a photoelectric cell.

It will be noted that the radiation emitter 5 and the photoelectric transducer 6 are located on the same level at opposite sides of the supporting frame 2 on which they are vertically reciprocable together with the source of treatment fluid represented by the device 1.

If the washing device 1 in the example shown is moved vertically downwards onto a vehicle 8 by means of the driving device 4, then, as soon as the light beam 7 is partly interrupted, the downward drive is switched off. If the vehicle 8 obscures the beam cross-section still further, then the driving device is switched on again, but with reversed direction. The washing device 1 is then displaced vertically upwards by the cylinders 4. The upward movement continues until the obscured cross-section of the light beam 7 has been reduced below the value which started the upward or return drive. Conversely, any change of the vehicle shape again unblocking the light beam 7 causes the downward drive to be switched on again until the cross-sectional area of the light beam 7 is sufficiently obstructed to arrest that drive.

Deactivation of the drive which moves the washing device toward the vehicle occurs when one-half or less of the light-beam cross-section is obscured by the vehicle contour, whereas actuation of the return drive takes place when substantially more than half the light-beam cross-section is obscured. This is shown schematically in FIG. 3. Here the numeral 9 designates the cross-section of the light beam 7 or the entrance aperture of the photoelectric cell 6.

Figure 2:
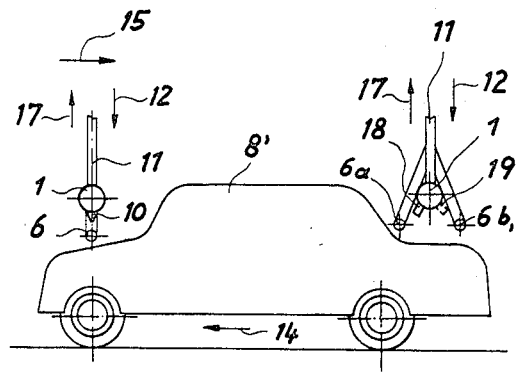
FIG. 2 is a partial side view of the part of the installation relating to the washing device.
Figure 3:
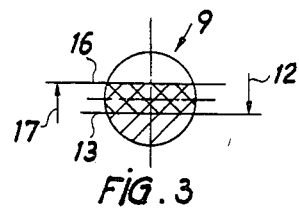
FIG. 3 is a schematic view of the light-beam cross-section.

In FIG. 2 the washing device 1, which has a number of nozzles 10 directed against the vehicle 8' and is connected by way of an arm 11 with any suitable drive means, moves toward the vehicle 8' in accordance with the arrow 12. As soon as the lower hatched portion of the cross-section 9 bounded by the line 13 (FIG. 3) of the aperture of the photoelectric cell 6 is obscured by the vehicle 8', the change of the photoelectric current resulting therefrom causes the downward motion of the washing device 1 to be switched off. The washing device 1 stops at this level until, owing to the simultaneous movement of the vehicle 8' in the direction of arrow 14 and/or of the washing device in the direction of the arrow 15, an additional portion of the cross-section 9 of the photoelectric-cell aperture corresponding to the region shown cross-hatched and bonded by the line 16 in FIG. 3 is obscured. When the photoelectric-cell current charges in response to this additional obstruction, the upward drive of the washing device (arrow 17) is switched on. These measures cause the washing device 1 to be displaced relative to the vehicle 8' substantially parallel to the surface thereof. By suitable choice of the distance of lines 13 and 16 or the photoelectric currents corresponding thereto, a "tolerance" may be predetermined so that minor changes of the outline of the vehicle 8' do not cause any vertical motion of the washing device. If desired, the upward drive may be switched on already before half the cross-section 9 is obscured. If the washing device 1 extends over a considerable distance in the direction of movement in accordance with the arrows 14 and 15, it is especially advantageous to provide two photoelectric cells 6a and 6b or to have electric eyes arranged on opposite sides of the washing device 1 as shown on the right half of FIG. 2. Obstruction of either photoelectric cell, to the extent specified, causes the above-described control of the vertical movement of the washing device 1. This ensures that, with a sudden and sharp rise in the contour of the vehicle, the washing device is moved upwardly in good time.

Figure 4:
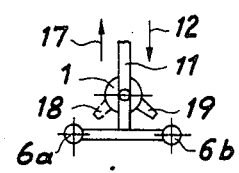
FIGS. 4 and 5 are side and front views of a modification of the system of FIG. 2 concerning the arrangement of the photoelectric elements.
Figure 5:
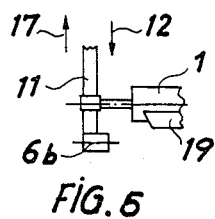

During the relative movement between washing device and vehicle the nozzles 10 are active and spray dry air or washing liquid against the vehicle surface. In an arrangement having two light barriers 6a and 6b arranged on both sides of the washing device in accordance with the right half of FIG. 2, it is of particular advantage to provide a nozzle arrangement pivotable into both directions or two nozzle arrangements 18, 19 directed in the respective directions, The pivotable nozzle arrangement or the paired nozzle arrangements 18 and 19 are coupled with the photoelectric cells 6a and 6b in such a manner that, upon obstruction of for example, the photoelectric cell 6a alone, the left-hand nozzle arrangement 18 is active, whilst when only the photoelectric cell 6b is obscured, the nozzle arrangement is swung toward the right or only the right-hand nozzle arrangement 19 is activated. Thus, if the washing device assumes a position directly in front of a steeply inclined surface of the vehicle, the nozzles are directed against this surface. If the washing device is still in front or already behind the vehicle, its downward movement may of course be limited by known means as, for example, limit switches or the like. The arrangement or mounting of the photoelectric cells 6a and 6b on both sides of the washing device 1 may be effected in several ways, as evident from the various alternatives shown in FIG. 2, FIG. 4, and FIG. 5.

Figure 6:
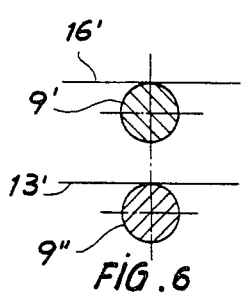
FIG. 6 is a schematic view of the effective light beam cross-section with two aligned photoelectric cells per electric eye.
Figure 7:
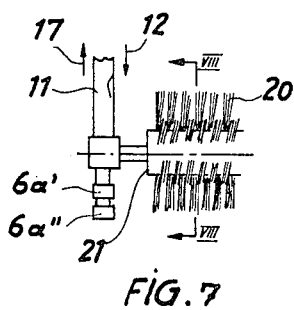
FIG. 7 is front view of an alternative embodiment with two photoelectric cells per electric eye.
Figure 8:
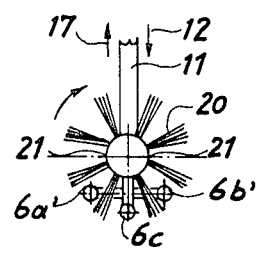
FIG. 8 is a sectional view along the line VIII—VIII of FIG. 7.

A further modification of the electric eye arrangement in accordance with the invention is shown in FIGS. 6 to 8. In this case a single electric eye is provided at one of its ends with two parallel-oriented photoelectric cells 6a' and 6a" having entrance apertures 9' and 9". As long as the outline of an obstruction entering from below into the combined beam area, consisting of the two individual cross-sections 9' and 9", remains below the line 13' (FIG. 6), thus as long as the lower photoelectric cell 6a" is not yet fully obscured, the downward drive of the washing device 1 is switched on. If line 13' has been crossed, i.e., if the effective area 9" of the photoelectric cell 6a" has been completely obscured, then the downwardly directed drive of the washing device is switched off, whilst the upwardly directed drive is switched on only in at line 16', i.e., after the effective area 9' of the upper photoelectric cell 6a' has also been fully obscured.

Thus, the same method of control is here involved as already described above. The use of two parallel-oriented photoelectric cells per electric eye, however, has the aforestated advantage of a more convenient separation of the criteria for the upward and downward movement of the washing device.

The use of such a twin-photoelectric-cell light detector is shown in FIGS. 7 and 8. In this case, however, the nozzle arrangement has been replaced by a rotary cylinder 21 with bristles 20 to act as washing devices. Furthermore, in this case, two upper photocells 6a', 6b' are supplemented by a common lower photoelectric cell 6c, which is particularly advantageous for the treatment of diagonally inclined surfaces in that it also affords a certain tolerance for outline changes in a horizontal direction. The use of such brush differs from that of the nozzle arrangements referred to above only in that the photoelectric cells do not generate direct current but, owing to their brief and recurrent obstruction by the fast-moving bristles 20, generate a succession of current pulses.

Figure 9:
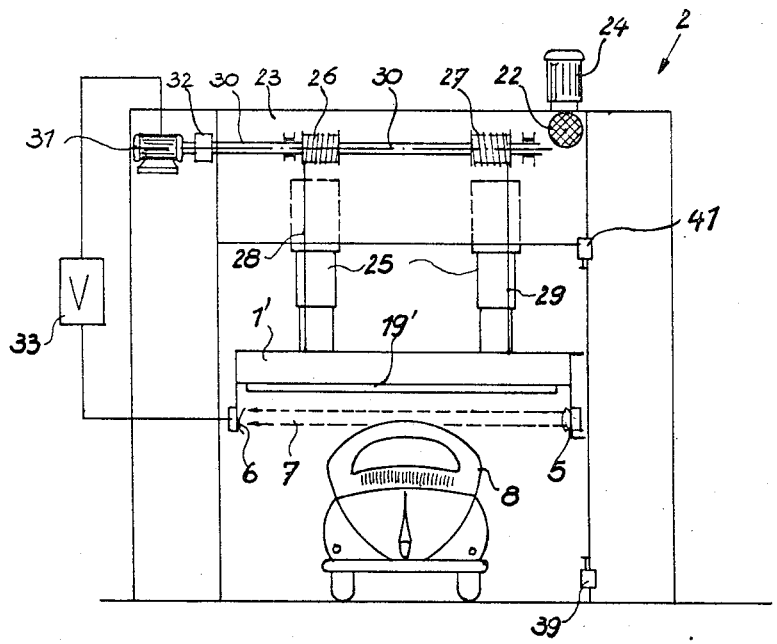
FIGS. 9 and 10 are schematic views of a drive for the washing device, illustrating diagrammatically the associated control circuit.

The arrangement installed in the gantry-like framework in accordance with FIG. 9 shows simple driving and controlling means for a car-drying installation to remove water adhering to the surface of the vehicle 8.

Air coming from a plenum chamber 1' through a nozzle 19' is discharged at high pressure against the vehicle roof. The air is aspirated at 22 by means of a fan located on the frame structure 2 in the interior of an upper chamber 23 and driven by a motor 24. From the chamber 23 air is forced through two telescopic conduits 25 into the plenum chamber 1'. The washing device comprising the chamber 1' and the nozzle 19' is moved vertically up and down, as required, by means of cables 28 and 29 passing through the two telescopic conduits 25. For this purpose these cables 28 and 29 are wound on capstans 26 and 27, mounted on a shaft 30, which are rotated in one or the other direction by means of a brake-equipped motor 31 via gearing 32. The motor 31 is controlled by an electric eye constituted by the light by the light beam 7 emitted from the light source 5 toward the photoelectric resistance 6.

Figure 10:
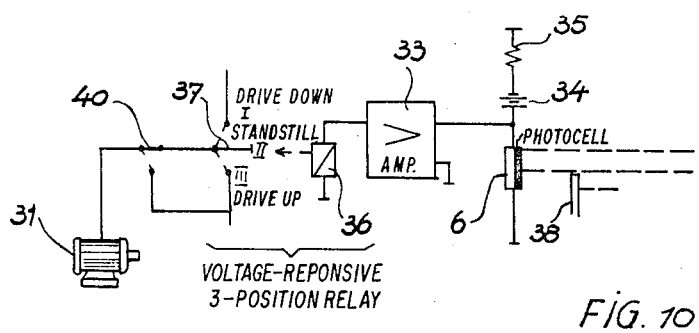

As shown schematically in FIG. 10, the transducer 6 is connected in series with a battery 34 and, if necessary, a current-limiting resistance 35. As long as the photoelectric resistance 6 is subjected to the full or only slightly reduced cross-section of the light beam 7, thus in a state of high conductivity, it at first supplies no or only a very low voltage, e.g., up to 5 v., to the input of an amplifier 33 connected to it. With gradual obscuring of the light-beam cross-section by an obstruction 38, e.g., the outlines of the vehicle 8 shown in FIG. 9, the voltage of the photoelectric resistance 6 increases.

A relay 36 connected in the output of the amplifier 33 is thereby energized and actuates a switch 37, from which a wire leads to the terminals of the motor 31. The relay 36 is so dimensioned that with a low input voltage to the amplifier, for example 0 to 5 v., the switch 37 is moved into the position I; with increasing input voltage, substantially in the region of 15 v., into position II; and with high input voltages, e.g., between 16 and 24 v., into the position III.

In position I (light-beam cross-section not or only slightly obscured) the switch 37 operates the motor 31 to release its braking device and to generate such a torque that the washing device 1', 19', owing to the load moment acting on the cable winches 26, 27, moves downwards. In position II (light-beam cross-section partly obscured) of the switch 37 only the braking device of the motor 31 is effective. The washing device 1', 19' is hence retained in its instant position. In position III (light-beam cross-section largely obstructed) of switch 37 the motor is supplied with such a voltage that it rotates the winding drums 26, 27 in the opposite direction and pulls the washing device 1', 19' upwards until, again owing to the increase of the light-beam cross-section and the consequent reduction of the photoelectric resistance, the amplifier input voltage has dropped to a predetermined value in which the switch 37 is changed over to position II.

In the absence of an obstruction, e.g., a vehicle, the downward movement of the washing device 1', 19' may be stopped by a limit switch 39 (FIG. 9). By means of another switch 40 (FIG. 10), the apparatus 1', 19' may be set into upward motion, independently of the position of switch 37, whereupon its engagement with a limit switch 41 (FIG. 9) turns the installation off. A similar control also permits the swiveling of the nozzle indicated in FIGS. 4 and 5 from right to left, or the alternate activation of the two nozzles 18, 19.

Thus, in accordance with the invention, the movement of the washing device of a vehicle-washing installation may be controlled by means of light beams with both nozzle and brush arrangements. It is particularly useful for drying the vehicle, since this operation involves the maintenance of a predetermined spacing of the nozzles through which the drying air is blown against the vehicle surface. For drying purposes, a row of individual nozzles as used for spray-washing is conveniently replaced by a wide-lip nozzle.

It will thus be seen that I have provided a treatment plant for bulky objects, specifically automotive vehicles, in which a source 1 of treatment fluid is mounted on a support 2, displaceable in a predetermined direction (i.e., horizontally) relatively to an object 8 or 8', and carries a source 1 or 1' of treatment fluid, such as drying air or a washing liquid, which can be moved in a direction generally transverse to that of relative displacement (i.e., vertically) together with a scanner 5 and an associated detector 6 positioned to receive radial energy from the scanner across the object. As explained with reference to FIG. 10, the detector 6 is adapted to discriminate between a relatively high, an intermediate and a relatively low rate of incidence of radiant energy (light) upon the detector to generate three distinct signals, i.e., the voltages mentioned above which set the control means 36, 37 in one of its three positions I, II and III. The drive means 31 responds, in turn, to the first signal by advancing the fluid source 1 or 1' toward the object (i.e., downwardly), to the second signal by arresting that source, and to the third signal by withdrawing the source from the object (i.e., moving it upwardly).

The invention may of course also be implemented with some other type of radiation, e.g., ultrasonic waves suitable for the same purpose. It is fundamentally irrelevant to the nature of the invention whether the washing device is led from above or from the side toward the vehicle. Therefore the invention is not limited to the embodiments particularly disclosed, except as specified in the appended claims.

I claim:
1. A treatment plant for bulky objects, comprising:
a support displaceable in a predetermined direction relatively to an object to be treated;
a source of treatment fluid on said support;
reversible drive means for displacing said source along said support in a direction generally transverse to the direction of relative displacement between said support and said object;
scanning means on said support for emitting at least one beam of radiant energy across said object;
detector means on said support positioned to receive said radiant energy at a rate dependent upon the degree of obstruction of said beam by said object, said scanning means and said detector means being coupled with said source for joint movement therewith in said generally transverse direction;
and control means coupled with said detector means and adapted to discriminate between a relatively high, an intermediate and a relatively low rate of incidence of said radiant energy upon said detector means for generating a first, a second and a third signal, respectively, said drive means being coupled with said control means for advancing said source toward said object in response to said first signal, arresting said source in response to said second signal and withdrawing said source from said object in response to said third signal.

2. A treatment plant as defined in claim 1 wherein said support comprises a frame having an opening for the passage of a vehicle constituting the object to be treated, said source including nozzle means and a mounting therefor vertically displaceable on said frame.

3. A treatment plant as defined in claim 2 wherein said scanning means comprises an emitter of light on one side of said frame and a photoelectric transducer on the other side of said frame substantially on the level of said emitter.

4. A treatment plant as defined in claim 2, further comprising switch means for operating said drive means to withdraw said source from said object independently of said control means.

References Cited

UNITED STATES PATENTS 2,258,733 10/1941 Brackett.
2,321,983 6/1943 Brackett.

EDWARD L. ROBERTS, *Primary Examiner.*